US012800347B2

(12) United States Patent
Lu et al.

(10) Patent No.: US 12,800,347 B2
(45) Date of Patent: Nov. 17, 2026

(54) ENCODER

(71) Applicant: Primax Electronics Ltd., Taipei (TW)

(72) Inventors: Chun-Cheng Lu, Taipei (TW); Ya-Jun Li, Taipei (TW)

(73) Assignee: Primax Electronics Ltd., Taipei (TW)

( * ) Notice: Subject to any disclaimer, the term of this patent is extended or adjusted under 35 U.S.C. 154(b) by 68 days.

(21) Appl. No.: 19/209,568

(22) Filed: May 15, 2025

(65) Prior Publication Data

US 2026/0118139 A1 Apr. 30, 2026

(30) Foreign Application Priority Data

Oct. 24, 2024 (CN) ........................ 202411491453.9

(51) Int. Cl.

*G01D 5/08* (2006.01)
*G01D 5/04* (2006.01)
*G01D 5/26* (2006.01)
*G01D 5/34* (2006.01)
*G01D 5/347* (2006.01)

(52) U.S. Cl.

CPC ................ *G01D 5/08* (2013.01); *G01D 5/04* (2013.01); *G01D 5/264* (2013.01); *G01D 5/342* (2013.01); *G01D 5/3473* (2013.01)

(58) Field of Classification Search

CPC ............ G01D 5/08; G01D 5/04; G01D 5/264; G01D 5/342; G01D 5/3473; G06F 3/03543; G06F 3/0362; G06F 3/0354; G05G 1/10

See application file for complete search history.

(56) References Cited

U.S. PATENT DOCUMENTS 7,155,755 B2 * 1/2007 Olivier ...................... E03D 9/08 4/420.4
12,321,537 B1 * 6/2025 Su ....................... G06F 3/03543
12,455,638 B1 * 10/2025 Hsueh ................ G06F 3/03543

* cited by examiner

*Primary Examiner* — Tony Ko

(74) *Attorney, Agent, or Firm* — KIRTON McCONKIE; Evan R. Witt

(57) ABSTRACT

An encoder includes a driven wheel, a housing, a carrier, a magnetic spur gear and a magnet. The driven wheel includes a first shaft bushing and a second shaft bushing. The housing includes a first shaft hole. The carrier includes a second shaft hole. The driven wheel is clamped between the housing and the carrier. The first shaft bushing is disposed within the first shaft hole. The second shaft bushing is disposed within the second shaft hole. The magnetic spur gear is installed on the driven wheel and synchronously rotated with the driven wheel. The magnet is located outside the magnetic spur gear and not contacted with the magnetic spur gear. When the driven wheel is rotated, a change of a magnetic attraction force between the magnetic spur gear and the magnet provides intermittent rotational resistance to the magnetic spur gear.

17 Claims, 12 Drawing Sheets

ENCODER

FIELD OF THE INVENTION

The present invention relates to an encoder, and more particularly to a silent encoder.

BACKGROUND OF THE INVENTION

Nowadays, an electronic device such as a mouse is equipped with a roller. A rotation shaft of the roller is inserted into a mechanical encoder. Consequently, the rotation of the roller can be sensed by the mechanical encoder. Furthermore, the mechanical encoder provides rotation resistance to the roller. The rotation resistance gives stepped tactile feedback when the roller is operated by the user.

However, the existing mechanical encoder usually uses a combination of a metal spring plate and a serrated disc to generate the stepped tactile feedback. During rotation, the metal spring plate can easily collide with the serrated disc. The collision between the metal spring plate and the serrated disc produces noise. In the quiet environments (e.g., in the offices) or during late-night hours, this noise may disturb users as well as nearby colleagues or family members.

Therefore, it is important to provide an improved encoder that can provide stepped tactile feedback without generating noise during rotation, allowing users to operate the roller quietly.

SUMMARY OF THE INVENTION

In order to overcome the drawbacks of the conventional technologies, the present invention provides an encoder capable of generating stepped tactile feedback and allowing the user to operate the roller quietly.

In accordance with an aspect of the present invention, an encoder is provided. The encoder includes a driven wheel, a housing, a carrier, a magnetic spur gear and a magnet. The driven wheel is rotatable about a rotational axis line. The driven wheel a first lateral surface, a second lateral surface, a first shaft bushing and a second shaft bushing. The first lateral surface and the second lateral surface are opposed to each other. The first shaft bushing is protruded externally from a middle region of the first lateral surface. The second shaft bushing is protruded externally from a middle region of the second lateral surface. The housing includes a first shaft hole. The carrier includes a first accommodation recess. The first accommodation recess has a second shaft hole. The driven wheel is clamped between the housing and the carrier. The first shaft bushing is disposed within the first shaft hole of the housing. The second shaft bushing is disposed within the second shaft hole of the carrier. The magnetic spur gear is installed on the driven wheel and synchronously rotated with the driven wheel. The magnetic spur gear includes a plurality of tooth structures and a plurality of tooth gaps. The plurality of tooth structures and the plurality of tooth gaps are arranged alternately. The magnet is located outside the magnetic spur gear and not contacted with the magnetic spur gear. When the driven wheel is rotated, the plurality of tooth structures are sequentially close to and away from the magnet, and a change of a magnetic attraction force between the magnetic spur gear and the magnet provides intermittent rotational resistance to the magnetic spur gear.

In an embodiment, the encoder further includes a plurality of positioning bulges. The plurality of positioning bulges are disposed on the first lateral surface of the driven wheel. Each of the plurality of positioning bulges is received within the corresponding tooth gap.

In an embodiment, a height of each positioning bulge is greater than a width of each tooth structure of the magnetic spur gear.

In an embodiment, the encoder further includes an annular optical grating, and the annular optical grating is extended from the second lateral surface of the driven wheel. The annular optical grating includes a plurality of light-blocking portions and a plurality of light-transmitting portions. Each light-transmitting portion is arranged between two adjacent light-blocking portions of the plurality of light-blocking portions.

In an embodiment, the encoder includes an optical rotation sensor, and the optical rotation sensor includes a light emitting terminal and a light receiving terminal. In addition, one of the light emitting terminal and the light receiving terminal is disposed inside the annular optical grating, and the other of the light emitting terminal and the light receiving terminal is located outside the annular optical grating.

In an embodiment, the carrier further includes a second accommodation recess. The second accommodation recess is located near the first accommodation recess. The magnet is received within the second accommodation recess.

In an embodiment, the housing is made of a non-magnetic material.

In an embodiment, a first perforation is formed in the first shaft bushing, a second perforation is formed in the second shaft bushing, and the first perforation and the second perforation are in communication with each other. Each of a first cross-sectional surface of the first perforation and a second cross-sectional surface of the second perforation has a triangular shape, a rectangular shape, a pentagonal shape or a hexagonal shape.

In an embodiment, a first perforation is formed in the first shaft bushing, and a cross-sectional surface of the first perforation has a triangular shape, a rectangular shape, a pentagonal shape or a hexagonal shape.

In accordance with another aspect of the present invention, an encoder is provided. The encoder includes a driven wheel, at least one magnet, a magnetic inner gear, a housing and a carrier. The driven wheel is rotatable about a rotational axis line. The driven wheel includes a first lateral surface, a second lateral surface, a first shaft bushing and a second shaft bushing. The first lateral surface and the second lateral surface are opposed to each other. The first shaft bushing is protruded externally from a middle region of the first lateral surface. The second shaft bushing is protruded externally from a middle region of the second lateral surface. The at least one magnet is disposed on the first lateral surface of the driving wheel and synchronously rotated with the driven wheel. The magnetic inner gear is arranged around the at least one magnet and not contacted with the at least one magnet. The magnetic inner gear includes a plurality of tooth structures. The housing includes a first shaft hole. The carrier includes a first accommodation recess. The first accommodation recess has a second shaft hole. The driven wheel is clamped between the housing and the carrier. The first shaft bushing is penetrated through the magnetic inner gear and inserted into the first shaft hole of the housing. The second shaft bushing is disposed within the second shaft hole of the carrier. When the driven wheel is rotated, the plurality of tooth structures are sequentially close to and away from the at least one magnet, and a change of a magnetic attraction force between the magnetic inner gear and the magnet provides intermittent rotational resistance to the magnetic inner gear.

In an embodiment, the magnetic inner gear is fixed in the first accommodation recess.

In an embodiment, at least one guiding notch is formed in the first accommodation recess, and at least one protrusion structure is disposed on the magnetic inner gear. The at least one protrusion structure is disposed within the corresponding guiding notch.

In an embodiment, the encoder further includes an annular optical grating, and the annular optical grating is extended from the second lateral surface of the driven wheel. The annular optical grating includes a plurality of light-blocking portions and a plurality of light-transmitting portions. Each light-transmitting portion is arranged between two adjacent light-blocking portions of the plurality of light-blocking portions.

In an embodiment, the encoder includes an optical rotation sensor, and the optical rotation sensor includes a light emitting terminal and a light receiving terminal. In addition, one of the light emitting terminal and the light receiving terminal is disposed inside the annular optical grating, and the other of the light emitting terminal and the light receiving terminal is located outside the annular optical grating.

In an embodiment, the housing is made of a non-magnetic material.

In an embodiment, a first perforation is formed in the first shaft bushing, a second perforation is formed in the second shaft bushing, and the first perforation and the second perforation are in communication with each other. Each of a first cross-sectional surface of the first perforation and a second cross-sectional surface of the second perforation has a triangular shape, a rectangular shape, a pentagonal shape or a hexagonal shape.

In an embodiment, a first perforation is formed in the first shaft bushing, and a cross-sectional surface of the first perforation has a triangular shape, a rectangular shape, a pentagonal shape or a hexagonal shape.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only.

The present invention provides an encoder. The encoder can be installed on an electronic device with a roller. For example, the electronic device is a mouse, a keyboard, a remote controller, an editing device, or a control device. When the roller is operated by the user, the use of the encoder can provide stepped tactile feedback without generating noise. Furthermore, the rotation shaft of the roller of the electronic device can be inserted into the encoder.

Figure 1:
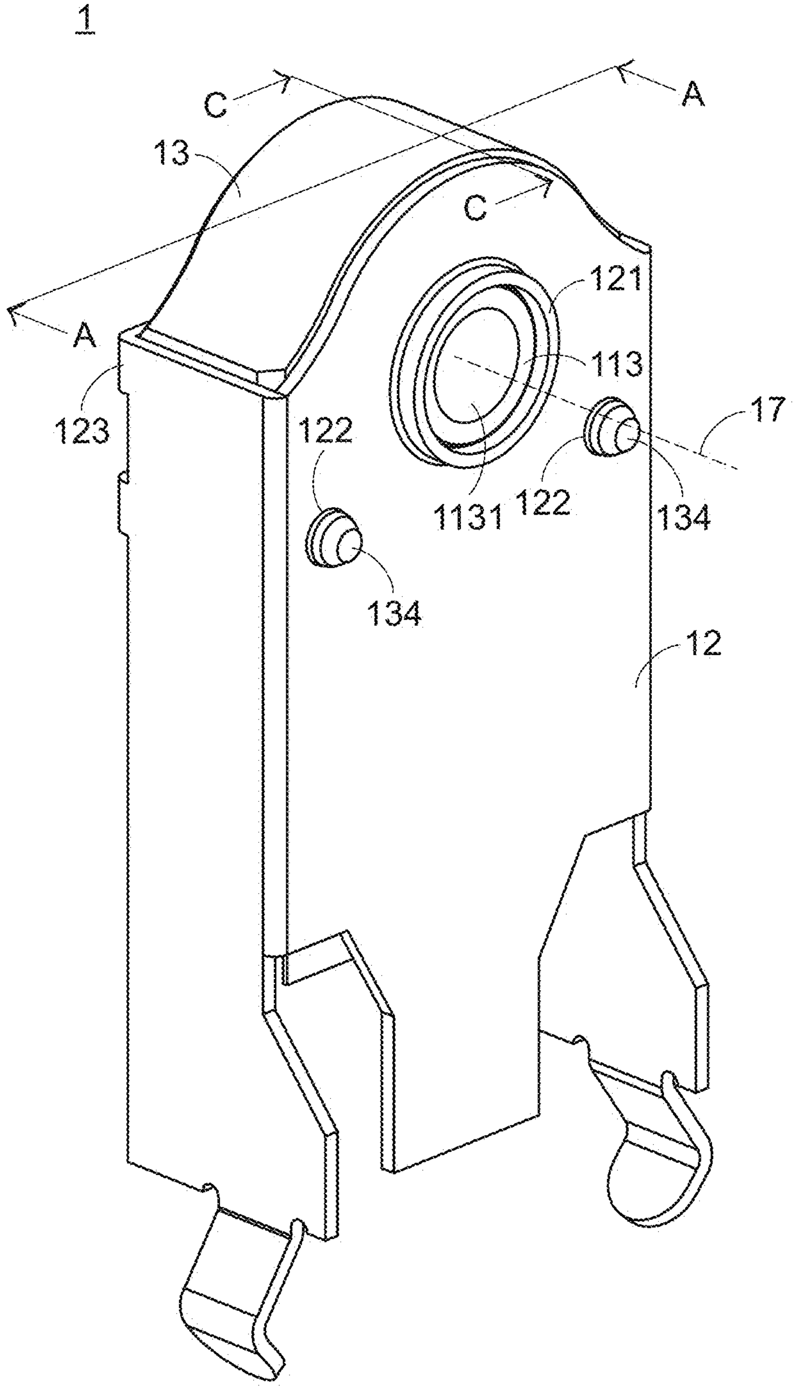
FIG. 1 is a schematic perspective view illustrating the structure of an encoder according to a first embodiment of the present invention.
Figure 2:
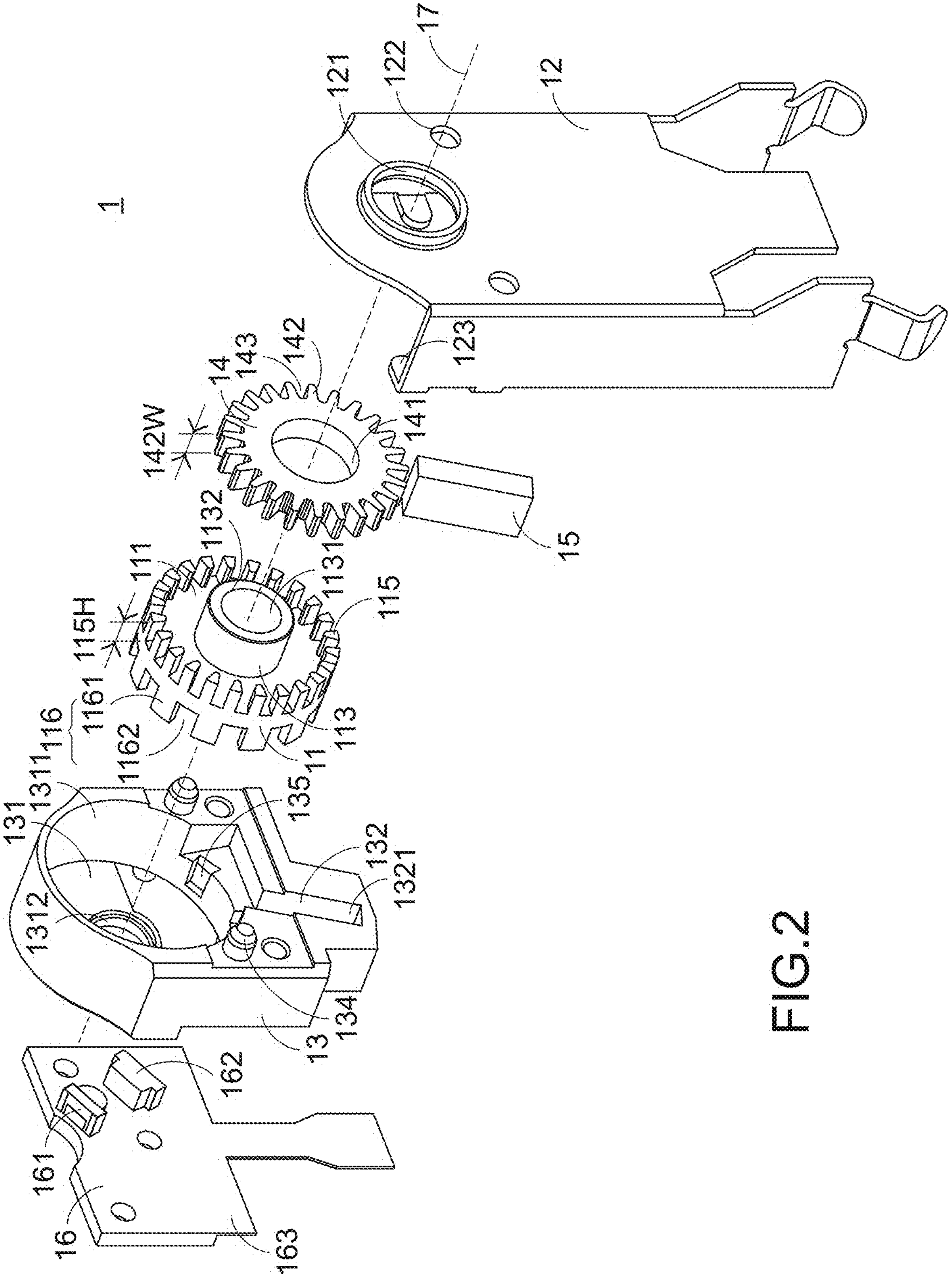
FIG. 2 is a schematic exploded view illustrating the structure of the encoder shown in FIG. 1.
Figure 3:
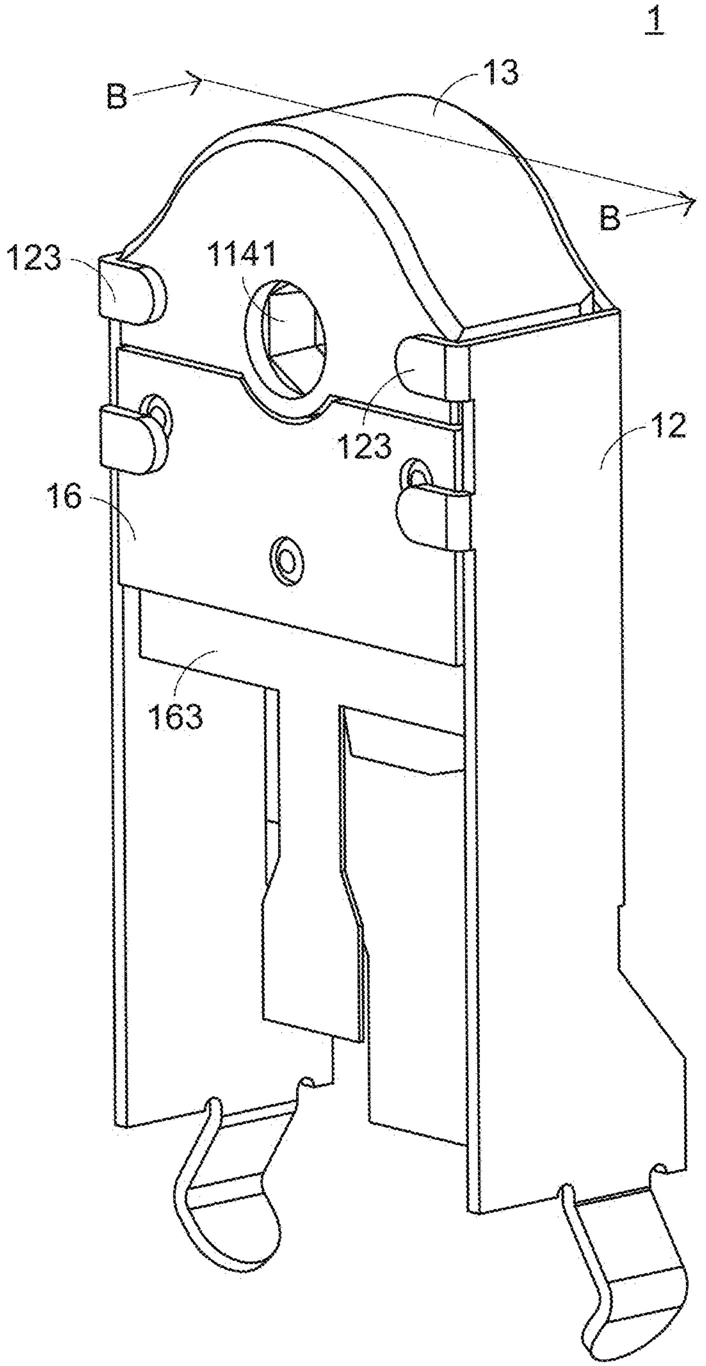
FIG. 3 is a schematic perspective view illustrating the structure of the encoder shown in FIG. 1 and taken along another viewpoint.
Figure 4:
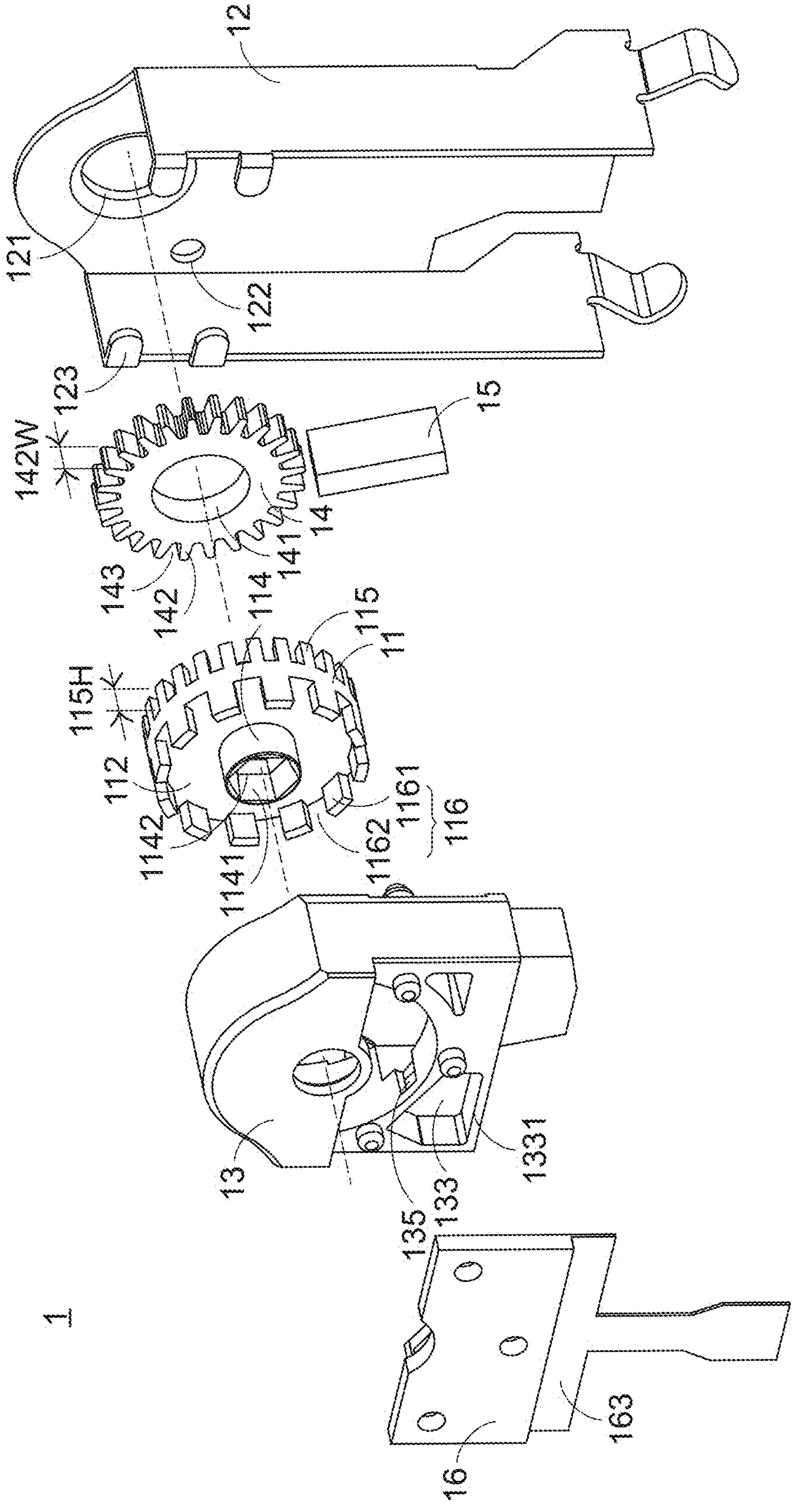
FIG. 4 is a schematic exploded view illustrating the structure of the encoder shown in FIG. 3.
Figure 5:
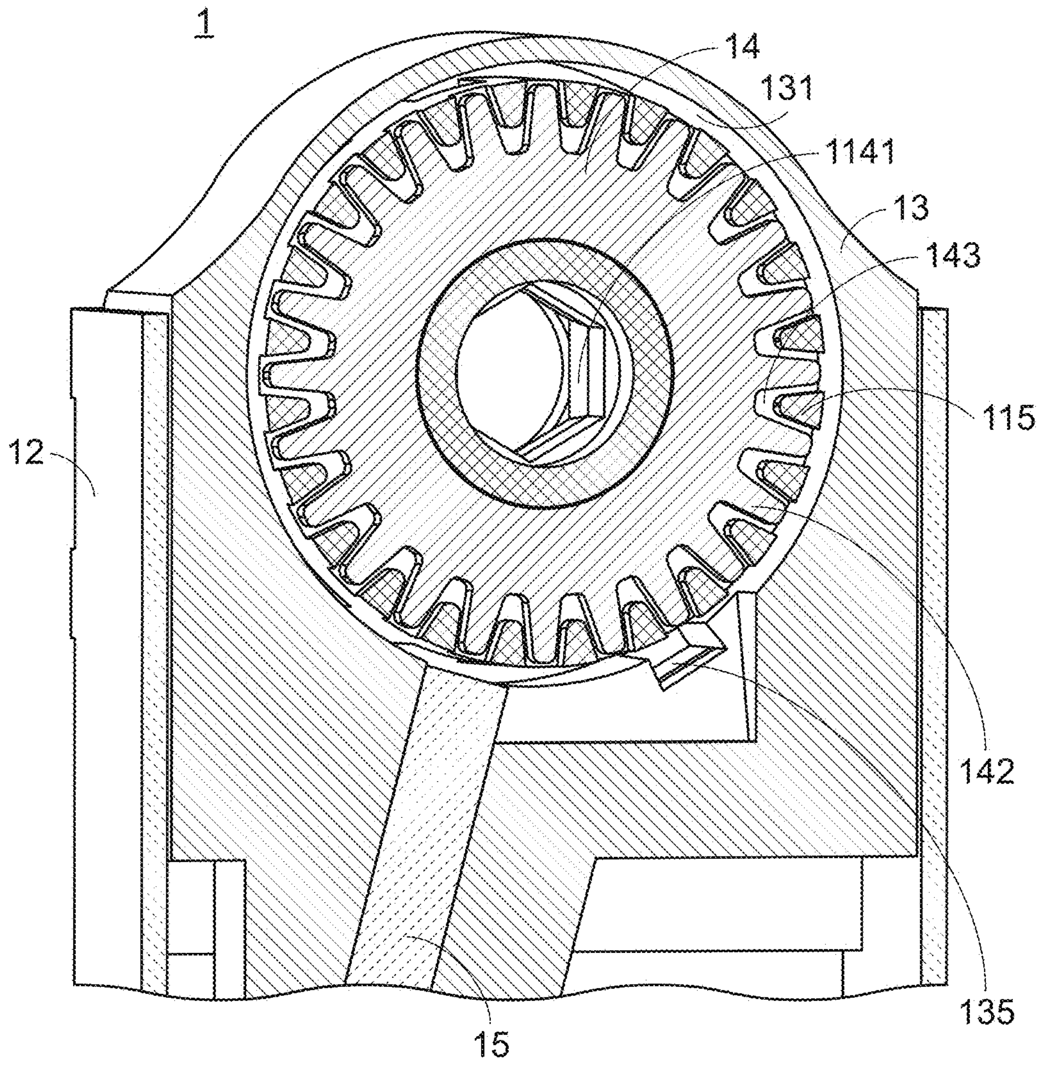
FIG. 5 is a schematic cutaway view illustrating the structure of the encoder shown in FIG. 1 and taken along the line A-A.
Figure 6:
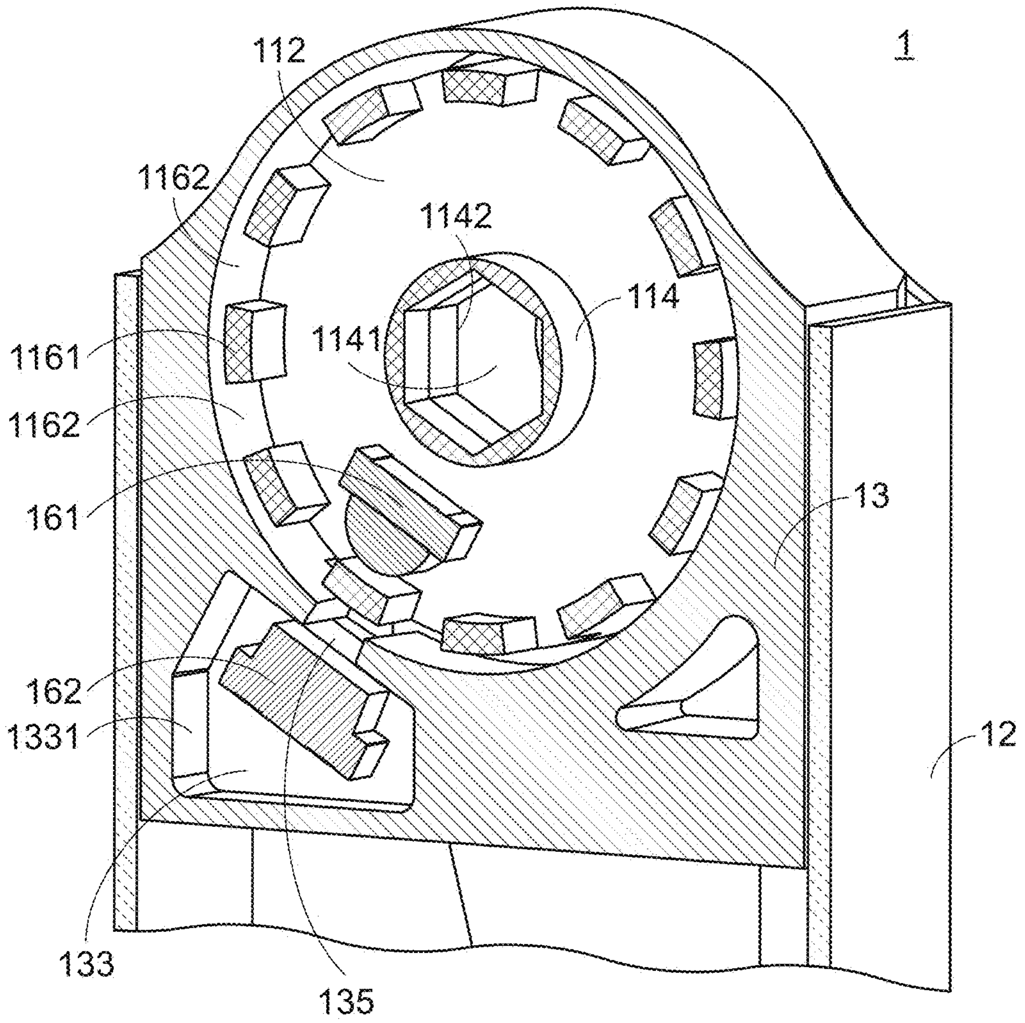
FIG. 6 is a schematic cutaway view illustrating the structure of the encoder shown in FIG. 3 and taken along the line B-B.
Figure 7:
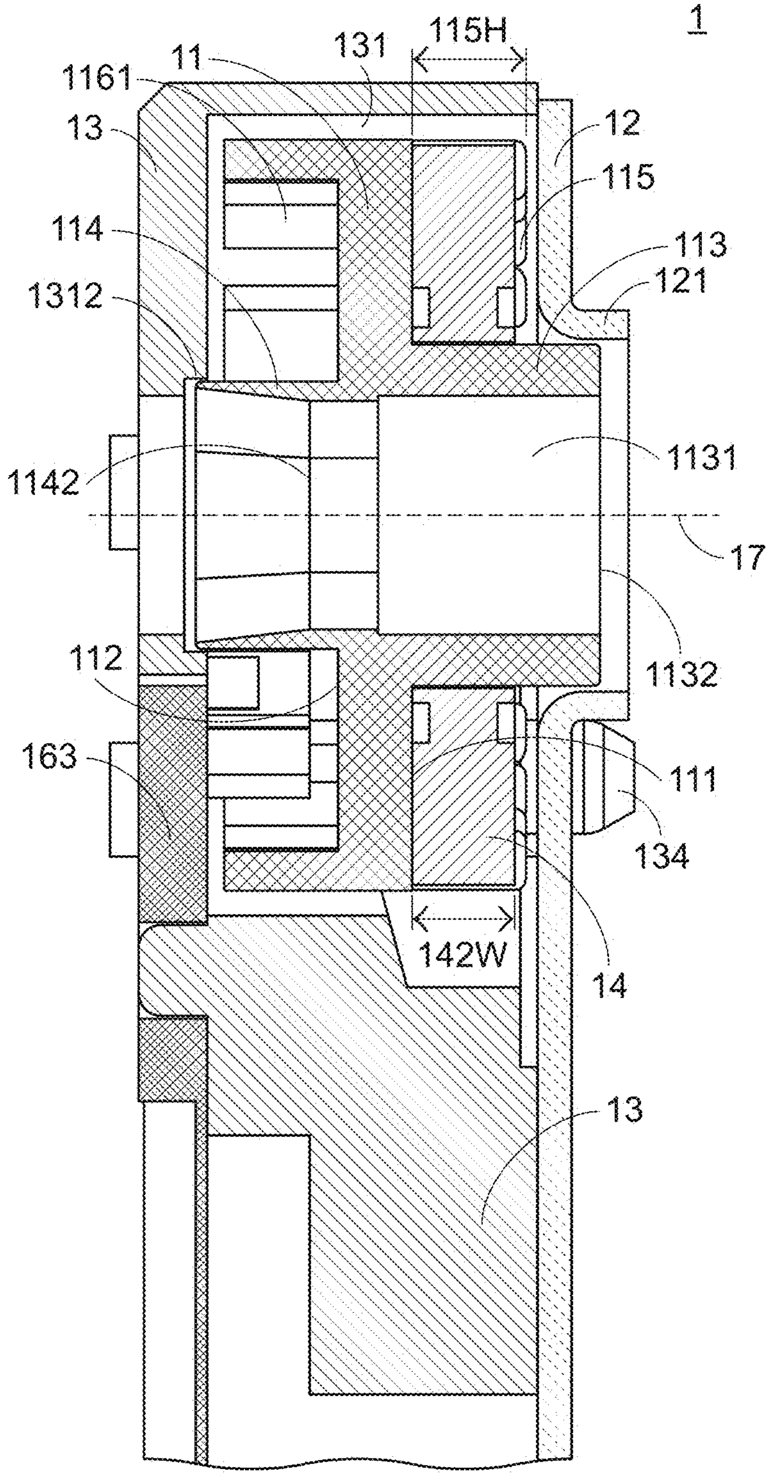
FIG. 7 is a schematic cross-sectional view illustrating the structure of the encoder shown in FIG. 1 and taken along the line C-C.

FIG. 1 is a schematic perspective view illustrating the structure of an encoder according to a first embodiment of the present invention. FIG. 2 is a schematic exploded view illustrating the structure of the encoder shown in FIG. 1. FIG. 3 is a schematic perspective view illustrating the structure of the encoder shown in FIG. 1 and taken along another viewpoint. FIG. 4 is a schematic exploded view illustrating the structure of the encoder shown in FIG. 3. FIG. 5 is a schematic cutaway view illustrating the structure of the encoder shown in FIG. 1 and taken along the line A-A. FIG. 6 is a schematic cutaway view illustrating the structure of the encoder shown in FIG. 3 and taken along the line B-B. FIG. 7 is a schematic cross-sectional view illustrating the structure of the encoder shown in FIG. 1 and taken along the line C-C. As shown in FIGS. 1 to 7, the encoder 1 of this embodiment includes a driven wheel 11, a housing 12, a carrier 13, a magnetic spur gear 14, a magnet 15 and an optical rotation sensor 16.

The driven wheel 11 is rotatable about a rotational axis line 17. Hereinafter, the direction parallel with the rotational axis line 17 will be referred to as an axial direction, and the direction perpendicular to the rotational axis line 17 will be referred to as a radial direction. In an embodiment, the driven wheel 11 includes a first lateral surface 111, a second lateral surface 112, a first shaft bushing 113 and a second shaft bushing 114. The first lateral surface 111 and the second lateral surface 112 are opposed to each other. The first shaft bushing 113 is protruded externally from a middle region of the first lateral surface 111. The second shaft bushing 114 is protruded externally from a middle region of the second lateral surface 112. In the driven wheel 11 of this embodiment, an end part of a rotation shaft of a roller (not shown) is inserted into the first shaft bushing 113 or the second shaft bushing 114.

In order to allow either the first shaft bushing 113 or the second shaft bushing 114 of the driven wheel 11 to rotate synchronously with the roller and to prevent relative rotation between them, the structures of the first shaft bushing 113 and the second shaft bushing 114 are specially designed. For example, a first perforation 1131 is formed in the first shaft bushing 113, and a second perforation 1141 is formed in the second shaft bushing 114. The first perforation 1131 and the second perforation 1141 are in communication with each other. Furthermore, each of a first cross-sectional surface 1132 of the first perforation 1131 and a second cross-sectional surface 1142 of the second perforation 1141 has a triangular shape, a rectangular shape, a pentagonal shape or a hexagonal shape. After a rotation shaft with the matching cross-sectional shape is inserted into the first perforation 1131 and the second perforation 1141, the relative rotation between the driven wheel 11 and the roller will be avoided.

In the encoder 1 of this embodiment, the rotation shaft is inserted into the first perforation 1131 and the second perforation 1141 sequentially, and the second cross-sectional surface 1142 of the second perforation 1141 has a hexagonal shape. In this configuration, the range of the first cross-sectional surface 1132 of the first perforation 1131 is larger than the range of the second cross-sectional surface 1142 of the second perforation 1141. For example, the first cross-sectional surface 1132 of the first perforation 1131 has a circular shape with the range covering the hexagonal shape of the second cross-sectional surface 1142. Consequently, the rotation shaft can be inserted into the first perforation 1131 with obstruction.

In another embodiment, the rotation shaft is inserted into the first perforation 1131 of the first shaft bushing 113 but not inserted into the second shaft bushing 114. Under this circumstance, only the first perforation 1131 is formed in the first shaft bushing 113. Furthermore, the first cross-sectional surface 1132 of the first perforation 1131 has a triangular shape, a rectangular shape, a pentagonal shape or a hexagonal shape. After a rotation shaft with the matching cross-sectional shape is inserted into the first perforation 1131, the relative rotation between the driven wheel 11 and the roller will be avoided.

In an embodiment, the housing 12 includes a first shaft hole 121, a positioning hole 122 and a fixing plate 123. The housing 12 is made of a material that is non-magnetic or non-magnetic attractive. For example, the housing 12 is made of plastic material, silicone, ceramic, or metal steel sheet.

In an embodiment, the carrier 13 includes a first accommodation recess 131, a second accommodation recess 132, a third accommodation recess 133, a snap 134 and a perforation 135. An entrance 1311 of the first accommodation recess 131 and an entrance 1321 of the second accommodation recess 132 face the housing 12 in the axial direction. An entrance 1331 of the third accommodation recess 133 faces the optical rotation sensor 16 in the axial direction. The perforation 135 is arranged between the first accommodation recess 131 and the third accommodation recess 133 to correspond with and cooperate with the optical rotation sensor 16.

The first accommodation recess 131 is used to accommodate the driven wheel 11. In addition, the first accommodation recess 131 has a second shaft hole 1312. When the driven wheel 11 is assembled and clamped between the housing 12 and the carrier 13, the first shaft bushing 113 of the driven wheel 11 is disposed within the first shaft hole 121 of the housing 12, and the second shaft bushing 114 of the driven wheel 11 is disposed within the second shaft hole 1312 of the carrier 13. Consequently, the driven wheel 11 can be rotated freely.

In the encoder 1 of this embodiment, the magnetic spur gear 14 can be rotated synchronously with the driven wheel 11, and the magnet 15 is located radially outside the magnetic spur gear 14. Due to the cooperation of the magnetic spur gear 14 and the magnet 15, the driven wheel 11 can be rotated quietly while providing the stepped tactile feedback.

In this embodiment, the magnetic spur gear 14 is installed on the driven wheel 11, and the magnetic spur gear 14 is synchronously rotated with the driven wheel 11. The magnetic spur gear 14 includes a third shaft hole 141, a plurality of tooth structures 142 and a plurality of tooth gaps 143. The third shaft hole 141 is sheathed around or fixed on the first shaft bushing 113. Consequently, the magnetic spur gear 14 and the driven wheel 11 are fixed on or combined with each other. The tooth structures 142 and the tooth gaps 143 are arranged alternately, and thus the magnetic spur gear 14 has the shape of a spur gear. Furthermore, the magnetic spur gear 14 has a stack structure of multiple thin sheets or has an integral structure.

The magnet 15 is disposed within the second accommodation recess 132 and located adjacent to the magnetic spur gear 14. The magnet 15 is located outside the magnetic spur gear 14 in a radial direction, which is perpendicular to the rotational axis line 17. In addition, the magnet 15 is not contacted with the magnetic spur gear 14. That is, regardless of how the magnetic spur gear 14 is rotated, the magnet 15 is not contacted with the tooth structures 142, and the magnet 15 is separated from the tooth structures 142.

Furthermore, the magnet 15 can magnetically attract the magnetic spur gear 14. Since the tooth structures 142 are closer to the magnet 15 than the tooth gaps 143, the magnetic attraction force between the magnet 15 and the tooth structures 142 is stronger. As the driven wheel 11 is rotated, the magnetic spur gear 14 is synchronously rotated with the driven wheel 11. During this process, the plurality of tooth structures 142 are sequentially close to and away from the magnet 15. Consequently, the magnetic attraction force between the magnetic spur gear 14 and the magnet 15 is subjected to a change. The change of the magnetic attraction results in intermittent rotational resistance during the rotation of the magnetic spur gear 14 and the driven wheel 11. When the rotational resistance is transmitted to the roller touched by the user's finger through the rotation shaft, the user can feel the stepped tactile feedback.

In order to prevent the magnetic spur gear 14 from contacting the housing 12, a first lateral surface 111 of the driven wheel 11 is further provided with a plurality of positioning bulges 115. These positioning bulges 115 are extended from the first lateral surface 111 toward the housing 12 in the axial direction. The height 115H of each positioning bulge 115 is the extension distance of the positioning bulge 115 from the first lateral surface 111 in the axial direction. The height 115H of each positioning bulge 115 is greater than the tooth width 142 W of the magnetic spur gear 14. Due to this design, the direct contact between the magnetic spur gear 14 and the housing 12 will be avoided. Consequently, the frictional noise will not be generated.

As mentioned above, the positioning bulges 115 are extended from the first lateral surface 111 toward the housing 12 in the axial direction. Furthermore, the positioning bulges 115 are received within corresponding tooth gaps 143 of the magnetic spur gear 14. This design can prevent relative rotation between the driven wheel 11 and the magnetic spur gear 14 to achieve a positioning effect. Furthermore, this design can ensure that the driven wheel 11 and the magnetic spur gear 14 can be rotated synchronously.

In the encoder 1 of this embodiment, an optical sensing method is utilized to detect the rotation of the driven wheel 11.

Furthermore, the second lateral surface 112 of the driven wheel 11 is provided with an annular optical grating 116. The annular optical grating 116 is extended from the second lateral surface 112 toward the carrier 13 in the axial direction. As the driven wheel 11 is rotated, the annular optical grating 116 is correspondingly rotated. The annular optical grating 116 includes a plurality of light-blocking portions 1161 and a plurality of light-transmitting portions 1162. Each light-transmitting portion 1162 is arranged between two adjacent light-blocking portions 1161.

Furthermore, the encoder 1 is equipped with the optical rotation sensor 16 corresponding to the annular optical grating 116. In an embodiment, the optical rotation sensor 16 includes a light emitting terminal 161, a light receiving terminal 162 and a circuit board 163. The light emitting terminal 161 and the light receiving terminal 162 are disposed on the circuit board 163. After the optical rotation sensor 16 is assembled with the carrier 13, one of the light emitting terminal 161 and the light receiving terminal 162 is disposed inside the annular optical grating 116, and the other of the light emitting terminal 161 and the light receiving terminal 162 is located outside the annular optical grating 116, especially disposed within the third accommodation recess 133.

Please refer to FIG. 6. In this embodiment, the light emitting terminal 161 is located inside the annular optical grating 116, and the light receiving terminal 162 is located outside the annular optical grating 116. It is noted that numerous modifications may be made while retaining the teachings of the present invention. For example, in another embodiment, the light receiving terminal 162 is located inside the annular optical grating 116, and the light emitting terminal 161 is located outside the annular optical grating 116.

When the light signal or light beam emitted from the light emitting terminal 161 contacts the light-blocking portion 1161, the light signal is either completely or partially blocked. Consequently, the light receiving terminal 162 cannot receive the light signal, the light receiving terminal 162 can only receive a portion of the light signal. When the light signal or light beam emitted from the light emitting terminal 161 contacts the light-transmitting portion 1162, the light signal is not blocked. Consequently, the light receiving terminal 162 can receive the light signal smoothly. As the annular optical grating 116 is rotated, the light receiving terminal 162 of the optical rotation sensor 16 intermittently receives the light signal from the light emitting terminal 161. In this way, the optical rotation sensor 16 can calculate the rotational displacement and rotational speed of the driven wheel 11. Furthermore, the light beam from the light emitting terminal 161 can pass through the perforation 135 of the carrier 13. In other words, the light receiving terminal 162 can receive the light signal without obstruction.

During the process of assembling the encoder 1, the driven wheel 11, the magnetic spur gear 14 and the magnet 15 are clamped within the internal space between the carrier 13 and the housing 12. In addition, the snap 134 of the carrier 13 is inserted into the positioning hole 122 of the housing 12 to prevent displacement between the carrier 13 and the housing 12. The fixing plate 123 of the housing 12 is bent to clamp the carrier 13. Consequently, the housing 12 and the carrier 13 will not be detached from each other.

In the encoder of the first embodiment, the magnet 15 is located outside the magnetic spur gear 14. It is noted that numerous modifications can be made while retaining the teachings of the present invention. For example, the magnet is located inside a magnetic inner gear. That is, the magnetic inner gear is located outside the magnet.

Figure 8:
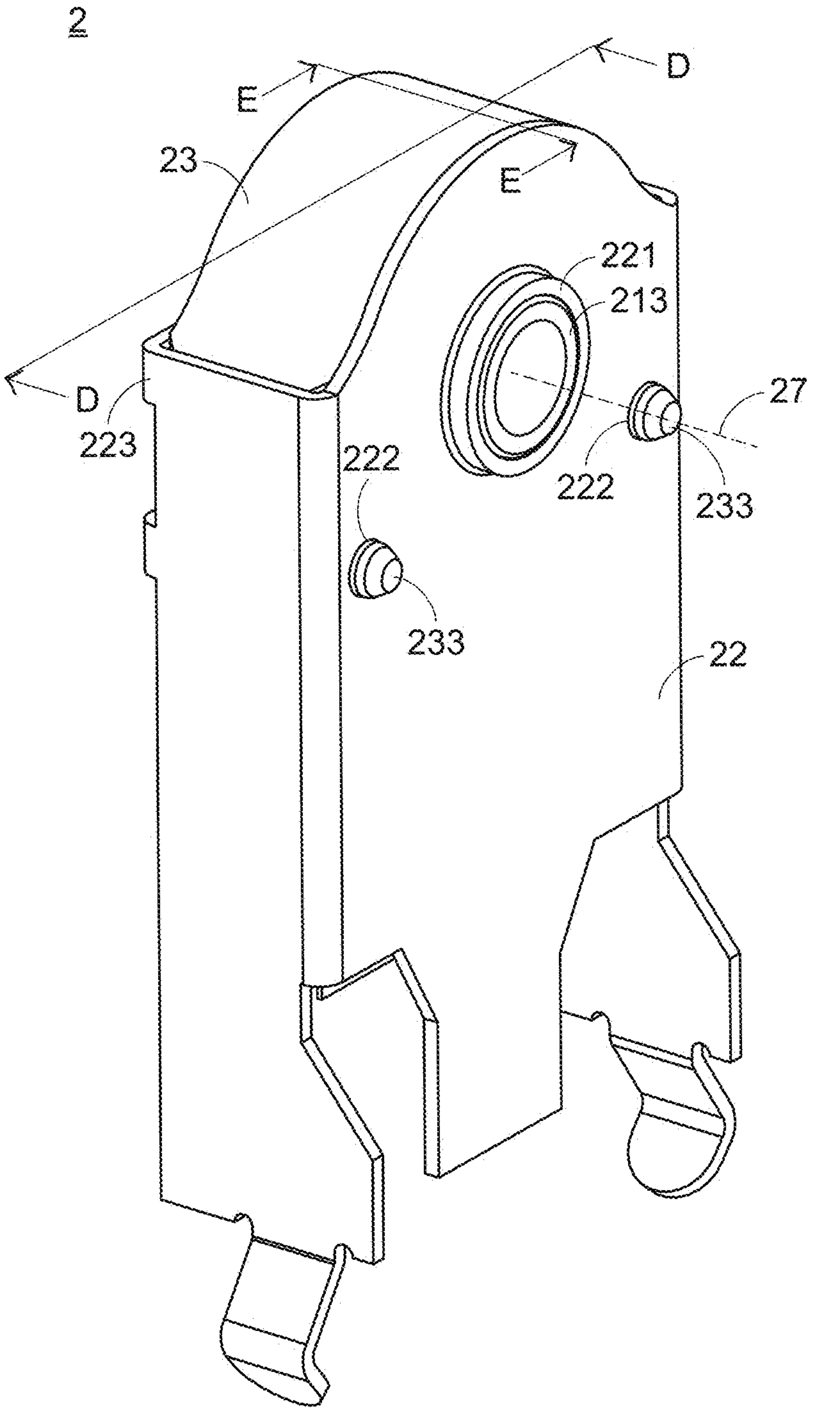
FIG. 8 is a schematic perspective view illustrating the structure of an encoder according to a second embodiment of the present invention.
Figure 9:
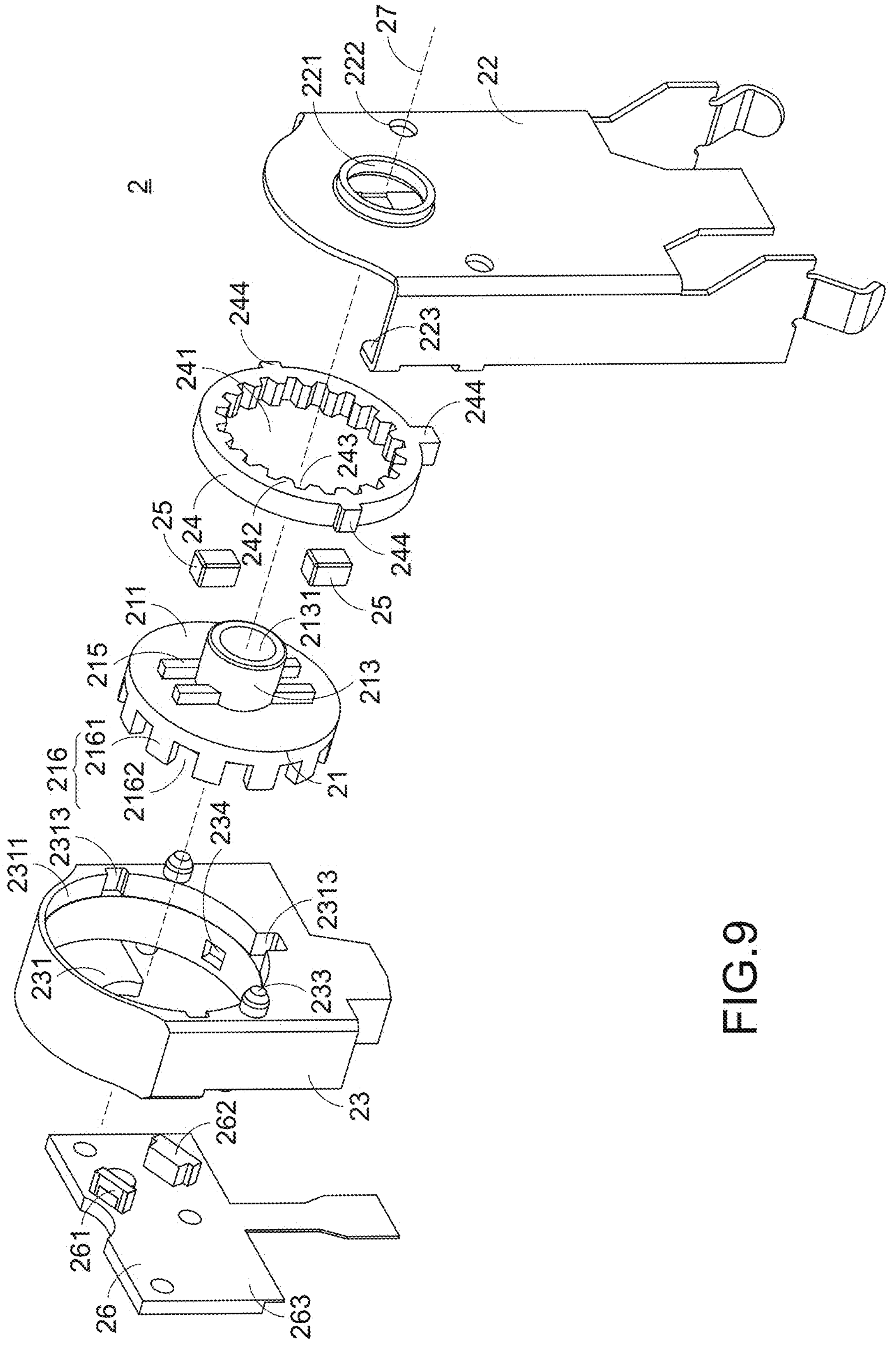
FIG. 9 is a schematic exploded view illustrating the structure of the encoder shown in FIG. 8.
Figure 10:
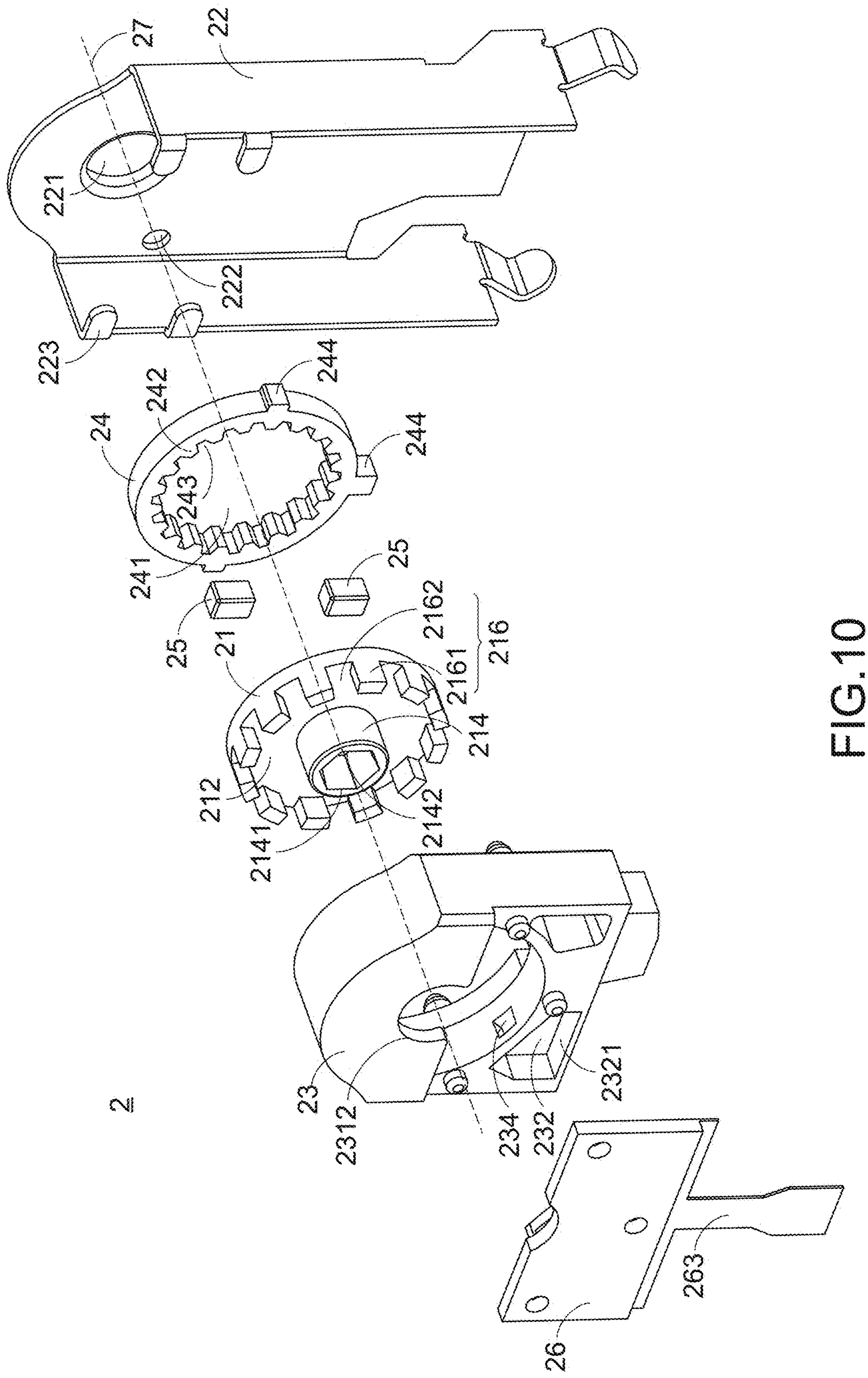
FIG. 10 is a schematic perspective view illustrating the structure of the encoder shown in FIG. 8 and taken along another viewpoint.
Figure 11:
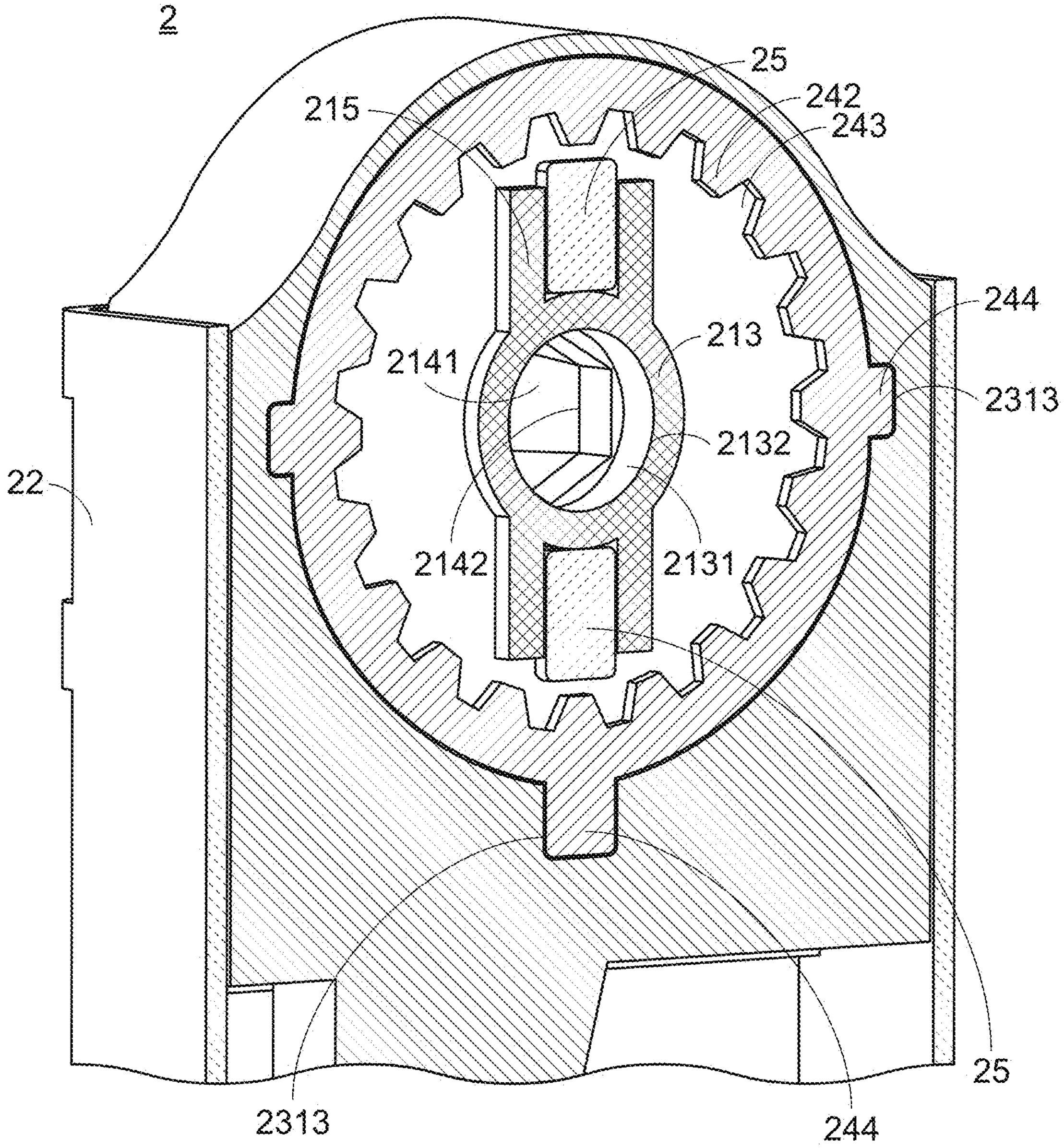
FIG. 11 is a schematic cutaway view illustrating the structure of the encoder shown in FIG. 8 and taken along the line D-D.
Figure 12:
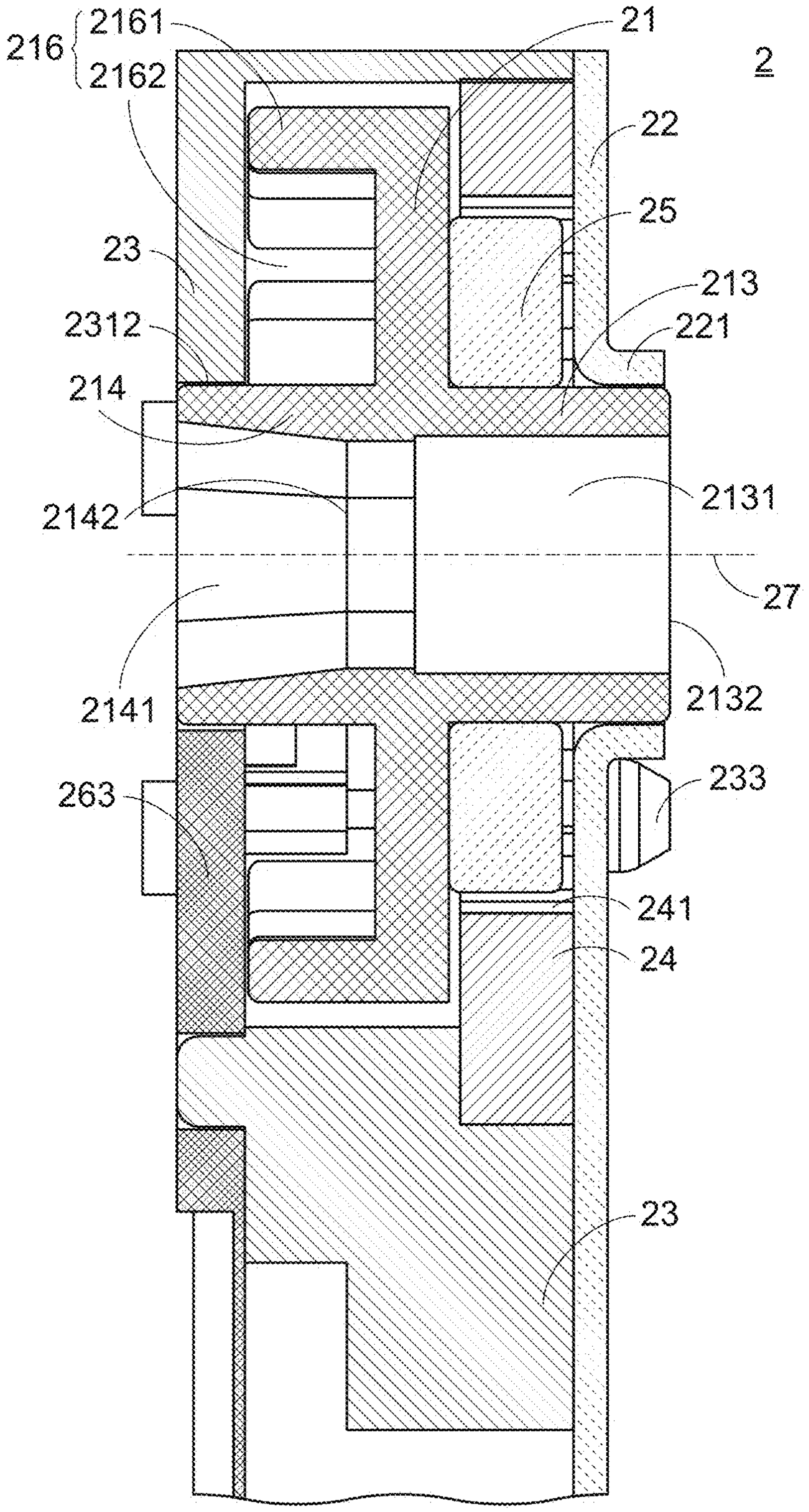
FIG. 12 is a schematic cross-sectional view illustrating the structure of the encoder shown in FIG. 8 and taken along the line E-E.

FIG. 8 is a schematic perspective view illustrating the structure of an encoder according to a second embodiment of the present invention. FIG. 9 is a schematic exploded view illustrating the structure of the encoder shown in FIG. 8. FIG. 10 is a schematic perspective view illustrating the structure of the encoder shown in FIG. 8 and taken along another viewpoint. FIG. 11 is a schematic cutaway view illustrating the structure of the encoder shown in FIG. 8 and taken along the line D-D. FIG. 12 is a schematic cross-sectional view illustrating the structure of the encoder shown in FIG. 8 and taken along the line E-E.

As shown in FIGS. 8 to 12, the encoder 2 of this embodiment includes a driven wheel 21, a housing 22, a carrier 23, a magnetic inner gear 24, at least one magnet 25 and an optical rotation sensor 26. In comparison with the encoder 1 of the first embodiment, the magnetic spur gear 14 is replaced with the magnetic inner gear 24, and the at least one magnet 25 is disposed within the magnetic inner gear 24.

The driven wheel 21 is rotatable about a rotational axis line 27. Hereinafter, the direction parallel with the rotational axis line 27 will be referred to as an axial direction, and the direction perpendicular to the rotational axis line 27 will be referred to as a radial direction.

In an embodiment, the driven wheel 21 includes a first lateral surface 211, a second lateral surface 212, a first shaft bushing 213 and a second shaft bushing 214. The first lateral surface 211 and the second lateral surface 212 are opposed to each other. The first shaft bushing 213 is protruded externally from a middle region of the first lateral surface 211. The second shaft bushing 214 is protruded externally from a middle region of the second lateral surface 212. In the driven wheel 12 of this embodiment, an end part of a rotation shaft of a roller (not shown) is inserted into the first shaft bushing 213 or the second shaft bushing 21.

In order to allow either the first shaft bushing 213 or the second shaft bushing 214 of the driven wheel 21 to rotate synchronously with the roller and to prevent relative rotation between them, the structures of the first shaft bushing 213 and the second shaft bushing 214 are specially designed. For example, a first perforation 2131 is formed in the first shaft bushing 213, and a second perforation 2141 is formed in the second shaft bushing 214. The first perforation 2131 and the second perforation 2141 are in communication with each other. Furthermore, each of a first cross-sectional surface 2132 of the first perforation 2131 and a second cross-sectional surface 2142 of the second perforation 2141 has a triangular shape, a rectangular shape, a pentagonal shape or a hexagonal shape. After a rotation shaft with the matching cross-sectional shape is inserted into the first perforation 2131 and the second perforation 2141, the relative rotation between the driven wheel 21 and the roller will be avoided.

In the encoder 2 of this embodiment, the rotation shaft is inserted into the first perforation 2131 and the second perforation 2141 sequentially, and the second cross-sectional surface 2142 of the second perforation 2141 has a hexagonal shape. In this configuration, the range of the first cross-sectional surface 2132 of the first perforation 2131 is larger than the range of the second cross-sectional surface 2142 of the second perforation 2141. For example, the first cross-sectional surface 2141 of the first perforation 2131 has a circular shape with the range covering the hexagonal shape of the second cross-sectional surface 2142. Consequently, the rotation shaft can be inserted into the first perforation 2131 with obstruction.

In another embodiment, the rotation shaft is inserted into the first perforation 2131 of the first shaft bushing 213 but not inserted into the second shaft bushing 214. Under this circumstance, only the first perforation 2131 is formed in the first shaft bushing 213. Furthermore, the first cross-sectional surface 2132 of the first perforation 2131 has a triangular shape, a rectangular shape, a pentagonal shape or a hexagonal shape. After a rotation shaft with the matching cross-sectional shape is inserted into the first perforation 2131, the relative rotation between the driven wheel 21 and the roller will be avoided.

In an embodiment, the housing 22 includes a first shaft hole 221, a positioning hole 222 and a fixing plate 223. The housing 22 is made of a material that is non-magnetic or non-magnetic attractive. For example, the housing 22 is made of plastic material, silicone, ceramic, or metal steel sheet.

In an embodiment, the carrier 23 includes a first accommodation recess 231, a second accommodation recess 232, a snap 233 and a perforation 234. An entrance 2311 of the first accommodation recess 231 faces the housing 22. Furthermore, at least one guiding notch 2313 is formed in an inner periphery of the entrance 2311 of the first accommodation recess 231 for installing the magnetic inner gear 24. An entrance 2321 of the second accommodation recess 232 faces the optical rotation sensor 26. The perforation 234 is arranged between the first accommodation recess 231 and the second accommodation recess 232 to correspond with and cooperate with the optical rotation sensor 26.

The first accommodation recess 231 is used to accommodate the driven wheel 21. In addition, the first accommodation recess 231 has a second shaft hole 2312. When the driven wheel 21 is assembled and clamped between the housing 22 and the carrier 23, the first shaft bushing 223 of the driven wheel 21 is disposed within the first shaft hole 121 of the housing 22, and the second shaft bushing 214 of the driven wheel 21 is disposed within the second shaft hole 2312 of the carrier 23. Consequently, the driven wheel 21 can be rotated freely.

In the encoder 2 of this embodiment, the at least one magnet 25 can be rotated synchronously with the driven wheel 21, and the magnetic inner gear 24 is located radially outside the at least one magnet 25. Due to the cooperation of the magnetic inner gear 24 and the at least one magnet 25, the driven wheel 21 can be rotated quietly while providing the stepped tactile feedback.

In an embodiment, the first lateral surface 211 of the driven wheel 21 is equipped with at least one positioning groove 215. The at least one magnet 25 is received and fixed within the corresponding positioning groove 215. Consequently, the at least one magnet 25 can be installed on the driven wheel 21 and synchronously rotated with the driven wheel 21. As shown in the drawings, two magnets 25 are symmetrically arranged on the driven wheel 21. It is noted that the number of the at least one magnet 25 is not restricted. For example, in some other embodiments, the driven wheel 21 is equipped with a single magnet or more than two magnets (e.g., three, four, six or eight magnets).

In this embodiment, the magnetic inner gear 24 includes a hollow portion 241, a plurality of tooth structures 242, a plurality of tooth gaps 243 and at least one protrusion structure 244. The tooth structures 242 and the tooth gaps 243 are arranged alternately on the inner periphery of the hollow portion 241, and thus the magnetic inner gear 24 has the inner tooth profile. The at least one protrusion structure 244 are disposed on the outer periphery of the magnetic inner gear 24. The Furthermore, the magnetic inner gear 24 has a stack structure of multiple thin sheets or has an integral structure.

In an embodiment, the magnetic inner gear 24 is arranged between the driven wheel 21 and the housing 22. The first shaft bushing 213 of the driven wheel 21 is penetrated through the hollow portion 241 of the magnetic inner gear 24 and then inserted into the first shaft hole 221 of the housing 22. Furthermore, the number and position of the at least one protrusion structure 244 of the magnetic inner gear 24 match the number and position of the at least one guiding notch 2313 of the first accommodation recess 231. When the at least one protrusion structure 244 is inserted into and engaged with the corresponding guiding notch 2313, the magnetic inner gear 24 is installed and fixed in the first accommodation recess 231.

In this embodiment, the magnetic inner gear 24 is located outside the magnet 25 in a radial direction, which is perpendicular to the rotational axis line 17. In addition, the magnetic inner gear 24 is not contacted with the magnet 25. That is, regardless of how the driven wheel 21 is rotated, the magnet 25 is not contacted with the magnetic inner gear 24, and the magnet 25 is separated from the tooth structures 242 of the magnetic inner gear 24. Furthermore, the magnet 25 can magnetically attract the magnetic inner gear 24. Since the tooth structures 242 are closer to the magnet 25 than the tooth gaps 243, the magnetic attraction force between the magnet 25 and the tooth structures 242 is stronger.

As the driven wheel 21 is rotated, the at least one magnet 25 is synchronously rotated with the driven wheel 21. During this process, the plurality of tooth structures 242 are sequentially close to and away from the magnet 25. Consequently, the magnetic attraction force between the magnet 25 and the magnetic inner gear 24 is subjected to a change. The change of the magnetic attraction results in intermittent rotational resistance during the rotation of the driven wheel 21. When the rotational resistance is transmitted to the roller touched by the user's finger through the rotation shaft, the user can feel the stepped tactile feedback.

In the encoder 2 of this embodiment, an optical sensing method is utilized to detect the rotation of the driven wheel 21.

Furthermore, the second lateral surface 212 of the driven wheel 21 is provided with an annular optical grating 216. The annular optical grating 216 is extended from the second lateral surface 212 toward the carrier 23 in the axial direction. As the driven wheel 21 is rotated, the annular optical grating 216 is correspondingly rotated. The annular optical grating 216 includes a plurality of light-blocking portions 2161 and a plurality of light-transmitting portions 2162. Each light-transmitting portion 2162 is arranged between two adjacent light-blocking portions 2161.

The encoder 2 is further equipped with an optical rotation sensor 26 corresponding to the annular optical grating 216. In an embodiment, the optical rotation sensor 26 includes a light emitting terminal 261, a light receiving terminal 262 and a circuit board 263. The light emitting terminal 261 and the light receiving terminal 262 are disposed on the circuit board 263. After the optical rotation sensor 26 is assembled with the carrier 23, one of the light emitting terminal 261 and the light receiving terminal 262 is disposed inside the annular optical grating 216, and the other of the light emitting terminal 261 and the light receiving terminal 262 is located outside the annular optical grating 216, especially disposed within the second accommodation recess 232. The arrangements and operations of the optical rotation sensor 26 and the annular optical grating 216 are similar to those of the optical rotation sensor 16 and the annular optical grating 116 of the first embodiment, and not redundantly described herein.

Furthermore, the light beam from the light emitting terminal 261 can pass through the perforation 234 of the carrier 23. In other words, the light receiving terminal 262 can receive the light signal without obstruction.

During the process of assembling the encoder 2, the driven wheel 21, the magnetic inner gear 24 and the magnet 25 are clamped within the internal space between the carrier 23 and the housing 22. In addition, the snap 233 of the carrier 23 is inserted into the positioning hole 222 of the housing 22 to prevent displacement between the carrier 23 and the housing 22. The fixing plate 223 of the housing 22 is bent to clamp the carrier 23. Consequently, the housing 22 and the carrier 23 will not be detached from each other.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An encoder, comprising:

a driven wheel rotatable about a rotational axis line, and comprising a first lateral surface, a second lateral surface, a first shaft bushing and a second shaft bushing, wherein the first lateral surface and the second lateral surface are opposed to each other, the first shaft bushing is protruded externally from a middle region of the first lateral surface, and the second shaft bushing is protruded externally from a middle region of the second lateral surface;

a housing comprising a first shaft hole;

a carrier comprising a first accommodation recess, wherein the first accommodation recess has a second shaft hole, the driven wheel is clamped between the housing and the carrier, the first shaft bushing is disposed within the first shaft hole of the housing, and the second shaft bushing is disposed within the second shaft hole of the carrier;

a magnetic spur gear installed on the driven wheel and synchronously rotated with the driven wheel, wherein the magnetic spur gear comprises a plurality of tooth structures and a plurality of tooth gaps, and the plurality of tooth structures and the plurality of tooth gaps are arranged alternately; and a magnet located outside the magnetic spur gear and not contacted with the magnetic spur gear, wherein when the driven wheel is rotated, the plurality of tooth structures are sequentially close to and away from the magnet, and a change of a magnetic attraction force between the magnetic spur gear and the magnet provides intermittent rotational resistance to the magnetic spur gear.

2. The encoder according to claim 1, wherein the encoder further comprises a plurality of positioning bulges, wherein the plurality of positioning bulges are disposed on the first lateral surface of the driven wheel, and each of the plurality of positioning bulges is received within the corresponding tooth gap.

3. The encoder according to claim 2, wherein a height of each positioning bulge is greater than a width of each tooth structure of the magnetic spur gear.

4. The encoder according to claim 1, wherein the encoder further comprises an annular optical grating, and the annular optical grating is extended from the second lateral surface of the driven wheel, wherein the annular optical grating comprises a plurality of light-blocking portions and a plurality of light-transmitting portions, and each light-transmitting portion is arranged between two adjacent light-blocking portions of the plurality of light-blocking portions.

5. The encoder according to claim 4, wherein the encoder comprises an optical rotation sensor, and the optical rotation sensor comprises a light emitting terminal and a light receiving terminal, wherein one of the light emitting terminal and the light receiving terminal is disposed inside the annular optical grating, and the other of the light emitting terminal and the light receiving terminal is located outside the annular optical grating.

6. The encoder according to claim 1, wherein the carrier further comprises a second accommodation recess, wherein the second accommodation recess is located near the first accommodation recess, and the magnet is received within the second accommodation recess.

7. The encoder according to claim 1, wherein the housing is made of a non-magnetic material.

8. The encoder according to claim 1, wherein a first perforation is formed in the first shaft bushing, a second perforation is formed in the second shaft bushing, and the first perforation and the second perforation are in communication with each other, wherein each of a first cross-sectional surface of the first perforation and a second cross-sectional surface of the second perforation has a triangular shape, a rectangular shape, a pentagonal shape or a hexagonal shape.

9. The encoder according to claim 1, wherein a first perforation is formed in the first shaft bushing, and a cross-sectional surface of the first perforation has a triangular shape, a rectangular shape, a pentagonal shape or a hexagonal shape.

10. An encoder, comprising:

a driven wheel rotatable about a rotational axis line, and comprising a first lateral surface, a second lateral surface, a first shaft bushing and a second shaft bushing, wherein the first lateral surface and the second lateral surface are opposed to each other, the first shaft bushing is protruded externally from a middle region of the first lateral surface, and the second shaft bushing is protruded externally from a middle region of the second lateral surface;

at least one magnet disposed on the first lateral surface of the driving wheel and synchronously rotated with the driven wheel;

a magnetic inner gear arranged around the at least one magnet and not contacted with the at least one magnet, wherein the magnetic inner gear comprises a plurality of tooth structures;

a housing comprising a first shaft hole; and a carrier comprising a first accommodation recess, wherein the first accommodation recess has a second shaft hole, the driven wheel is clamped between the housing and the carrier, the first shaft bushing is penetrated through the magnetic inner gear and inserted into the first shaft hole of the housing, and the second shaft bushing is disposed within the second shaft hole of the carrier;

wherein when the driven wheel is rotated, the plurality of tooth structures are sequentially close to and away from the at least one magnet, and a change of a magnetic attraction force between the magnetic inner gear and the magnet provides intermittent rotational resistance to the magnetic inner gear.

11. The encoder according to claim 10, wherein the magnetic inner gear is fixed in the first accommodation recess.

12. The encoder according to claim 11, wherein at least one guiding notch is formed in the first accommodation recess, and at least one protrusion structure is disposed on the magnetic inner gear, wherein the at least one protrusion structure is disposed within the corresponding guiding notch.

13. The encoder according to claim 10, wherein the encoder further comprises an annular optical grating, and the annular optical grating is extended from the second lateral surface of the driven wheel, wherein the annular optical grating comprises a plurality of light-blocking portions and a plurality of light-transmitting portions, and each light-transmitting portion is arranged between two adjacent light-blocking portions of the plurality of light-blocking portions.

14. The encoder according to claim 10, wherein the encoder comprises an optical rotation sensor, and the optical rotation sensor comprises a light emitting terminal and a light receiving terminal, wherein one of the light emitting terminal and the light receiving terminal is disposed inside the annular optical grating, and the other of the light emitting terminal and the light receiving terminal is located outside the annular optical grating.

15. The encoder according to claim 10, wherein the housing is made of a non-magnetic material.

16. The encoder according to claim 10, wherein a first perforation is formed in the first shaft bushing, a second perforation is formed in the second shaft bushing, and the first perforation and the second perforation are in communication with each other, wherein each of a first cross-sectional surface of the first perforation and a second cross-sectional surface of the second perforation has a triangular shape, a rectangular shape, a pentagonal shape or a hexagonal shape.

17. The encoder according to claim 10, wherein a first perforation is formed in the first shaft bushing, and a cross-sectional surface of the first perforation has a triangular shape, a rectangular shape, a pentagonal shape or a hexagonal shape.

* * * * *